United States Patent Office 3,684,528
Patented Aug. 15, 1972

3,684,528
FAST SETTING MARSHMALLOW TYPE CONFECTION
Robert William Batey, Port Chester, N.Y., assignor to International Telephone and Telegraph Corporation, Nutley, N.J.
No Drawing. Filed May 28, 1970, Ser. No. 41,640
Int. Cl. A23g 3/00
U.S. Cl. 99—134 A      10 Claims

ABSTRACT OF THE DISCLOSURE

A fast setting confectionery cream useful in preparing marshmallows, containing shortening, sugar, water, gelatin, flavoring and non-fat milk solids. The bulk density is comparable to slab marshmallow and requires no cooking.

BACKGROUND OF THE INVENTION

This invention relates to confectionary products of the character commonly known as marshmallow, and to the preparation thereof. In a more particular sense, this invention is directed to a fast setting marshmallow type confection and procedure for making the same.

In the commercial production of marshmallow the desired ingredients are mixed, aerated and cast in starch or deposited on a slab until the texture of the marshmallow sets. The setting time for a marshmallow may be as long as 12 hours. In one production method for a bar type product having a syrup-cereal base and a marshmallow layer on top, the marshmallow layer has to set before a slab of the product can be cut into individual bars. A second production method requires that the cereal-syrup base be cut to bar size and the marshmallow carefully deposited on each individual bar as it passes under a depositing head. These methods are not suitable for automatic equipment in which there is continuous sheeting and cutting of the cereal base into the bar shape. Such equipment requires a marshmallow type layer which can be placed on the cereal base and set in a couple of minutes instead of 3–12 hours. The entire operation to deposit the marshmallow and cut it into bar size and shape should be completed in a few minutes.

According to present commercial practice, in forming a slab marshmallow, the grain structure from the whipping agent supports the shape of the confection.

In forming the cast marshmallow, the sides of the cornstarch mold holds the confection in place until enough moisture has been removed from the outer portion to give the piece the ability to stand by itself.

A typical commercial formula for a gelatin slab marshmallow is as follows: 18 oz. granulated gelatin 175 bloom, 4 lb. cold water, 20 lb. granulated sugar, 6 lb. water, 8 lb. standardized invert sugar, 15 lb. corn syrup and 1 lb. sorbitol. Procedure: Mix gelatin and 4 lb. of water in container and set aside. Mix sugar in 6 lb. of water with the invert sugar, corn syrup and sorbitol in kettle and heat to 180° F. The gelatin-water mix is added to the heated syrup. The above mix is transferred to a marshmallow beater and beaten to the desired density. Marshmallows are generally beaten until 1 gallon weighs 4 pounds or a 0.48 gm./cc. density.

The conventional slab marshmallow can be used for casting. However, since the cast marshmallow must be pumped to and through a depositor, and it also loses moisture in the starch mold, a higher strength gelatin a smaller amount is used. A typical commercial marshmallow for casting is as follows: 2½ lb. gelatin 225 bloom, 12 lb. water, 60 lb. granulated sugar, 20 lb. water, 10 lb. standardized invert sugar, 40 lb. corn syrup and 3 lb. sorbitol. Procedure: Mix gelatin and 12 lb. of water in a container and set aside. Mix sugar in 20 pounds of water with the invert sugar, corn syrup and sorbitol in kettle and heat to 180° F. Add water-gelatin mix to the heated syrup and transfer to marshmallow beater. Marshmallows are generally beaten until 1 gallon weighs 4 pounds or a 0.48 gm./cc. density. The temperature of the marshmallow for casting should be between 95° F. and 100° F. The hopper of the depositor should be about 100° F. when the marshmallow is added. The casting starch should be between 90° F. to 95° F. After the marshmallow is deposited in the dry starch it is covered with dry starch and held for approximately 12 hours. At the end of this time the finished marshmallows are separated from the starch by the use of a screen. When this marshmallow is deposited directly on, for example, a cookie and then enrobed, it must be stored for at least 48 hours at 72° F. to allow the deposited marshmallow to become firm.

SUMMARY OF THE INVENTION

Therefore, an object of the invention is to provide a fast setting marshmallow type of confection product and method of preparation thereof.

Another object of the invention is to formulate a marshmallow type confection that can be machined, cut and handled, within a couple of minutes of the time it was deposited on the base material.

A further object of the invention is to provide a marshmallow type product that can be pumped or spread within an hour of preparation if properly contained.

Further objects and advantages will appear in the course of the following description.

DESCRIPTION OF THE PREFERRED EMBODIMENTS

The conventional marshmallow is a low density confection that uses gelatin as the agent for incorporating and holding air in the product. If any fat is present in the preparation of this marshmallow it tends to inhibit the whipping properties of the gelatin. In the fast setting marshmallow type product according to the invention, the air is incorporated into the product by creaming the air into a sugar shortening cream mix. The dissolved gelatin is distribtued through this cream without disturbing the air in the cellular structure of the cream mix. The gelatin sets on cooling to give the product its marshmallow type texture.

In the production of conventional marshmallow the initial moisture content of the marshmallow is kept high (28% to 30%) to insure a tender marshmallow. However, every effort is made to keep the dissolved solids at least 68% to retard the growth of micro-organisms. This marshmallow will lose moisture if stored at a relative humidity of less than 50%. In contrast, the moisture content of the fast setting marshmallow type confection is 19.0%. The fat in this confection tends to improve the handling qualities and the storage stability. If the fat were removed, the moisture content would be approximately 24%.

A formula was developed incorporating approximately 2% Grayslake Gelatin (low viscosity, pH 4.60, 249 bloom), and less powdered sugar. The product resulting from this formula, hereinafter particularly described in connection with specific examples, sets after approximately 2 minutes so that when it is cut, the pieces do not stick together on standing, and this product is not sticky.

The following specific examples will serve to illustrate the procedure and products of the present invention. All ingredients are referred to in parts by weight unless indicated otherwise.

EXAMPLE I

| | Parts by weight |
|---|---|
| Shortening Durkee S-2-795 (70° F.-75° F.) | 240 |
| Sugar, powdered | 540 |
| Salt | 2.5 |
| Vanilla, concentrate "Paniplus" (dry) | 2.5 |
| Nonfat dry milk solids | 55 |
| Water (65° F.) | 100 |
| Water (135° F.-140° F.) | 100 |
| Gelatin, Grayslake Gelatin low viscosity, 249 bloom | 20 |

Procedure: Cream shortening in 4-quart Hobart Mixer bowl to break down shortening lumps. Blend powdered sugar, salt, vanilla concentrate (dry), and nonfat milk solids together in separate container and add to creamed shortening with low speed mixing. Increase mixer to medium speed at end of above addition.

Add 100 parts of water at 65° F. slowly to creamed shortening and sugar mix. Blend for 4-6 minutes at medium speed. Scrape down bowl several times to insure all ingredients are blended. During this period the mixture becomes a light fluffy cream filling with low density.

Put 100 parts of heated water (135° F.-140° F.) in a separate container. Add the 20 parts of gelatin with very vigorous stirring.

Pour the gelatin and water mix directly into creamed mixture in mixer bowl while mixer is operating at medium speed. Stop mixing when all of gelatin water mix has been added to creamed mix in mixer bowl. Bulk density will decrease if mixing is continued. The bulk density of the above marshmallow is 0.48 parts per cc. which is comparable to a slab or cast marshallow.

This marshmallow can be pumped or spread if used within an hour of preparation. The marshmallow should be held in a large bowl or large hopper to keep it from setting.

EXAMPLE II

Using the same procedure as was followed in Example I, a product was made without the nonfat dry milk solids and with a coffee flavor.

| | Parts by weight |
|---|---|
| Shortening Durkee S-2-795 | 240 |
| Powdered sugar | 540 |
| Water 65° F. | 100 |
| Ruxcafe Coffee Flavor | 7 |
| Water (hot—130° F.) | 100 |
| Gelatin (Grayslake—low viscostiy), 249 bloom | 20 |

EXAMPLE III

Using the same procedure as was followed in Example I, a product was made without the nonfat dry milk solids and with added acids and flavors.

| | Parts by weight |
|---|---|
| Shortening Durkee S-2-795 | 240 |
| Powdered sugar | 540 |
| Water 65° F. | 100 |
| Flavor: | |
|    Citric acid | 3.2 |
|    Malic acid | 1.6 |
|    Brandy Imitation No. 08 Fritzche | 0.13 |
|    Pralene No. 1250 Felton | 0.80 |
| Water (hot—130° F.) | 100 |
| Gelatin (Grayslake, low viscosity), 249 bloom | 20 |

It is understood, of course, that a number of variations using different shortenings and emulsifiers, sugars—sucrose, dextrose, corn syrup, invert syrup, and combinations of these, setting agents—gelatins, gums, hydrocoloils, and combinations of these, and humectants—glycerine, sorbitol. The temperature of the water added to the creamed sugar and shortening was varied. At temperatures as low as 40° F. the product tended to pull on the sides of the extruder, and at temperatures as high as 78° F. the product was too slack and its definition bad. At a temperature of approximately 65° F., the product had good definition and the extruded surfaces were smooth.

The invention described above encompasses the forming of a low density cream with sugars and fats and then setting this foam with the dissolved gelatin in a very short time. The cream is not cooked, and the end product a fast setting marshmallow type confection.

Variations in materials, proportions and procedures will be apparent to the practitioner, such variiations coming within the scope of this invention, which is limited only by the following claims.

I claim:
1. A fast setting composition to be utilized in preparing a marshmallow type confection comprising in approximate parts by weight:
   240 parts of a shortening;
   540 parts of a sugar;
   200 parts of water;
   20 parts of a low viscosity gelatin, 249 bloom; and
   5-7 parts of a flavoring.
2. The composition of claim 1 including 55 parts of nonfat dry milk solids.
3. The method of making a fast setting marshmallow type confection comprising the steps of:
   creaming a mixture of about 240 parts by weight of a shortening and about 540 parts by weight of a sugar;
   adding about 100 parts by weight of water at approximately 65° F. to the creamed mixture and blending to form a light fluffy cream with low density;
   dissolving approximately 20 parts by weight of gelatin into approximately 100 parts by weight of water; and
   pouring dissolved gelatin into the cream and mixing while pouring.
4. The method of claim 3 including the step of blending about 55 parts by weight of nonfat dry milk solids into said creamed mixture.
5. The method of claim 4 including the step of blending about 5-7 parts by weight of flavors into said creamed mixture.
6. The method of making a fast setting marshmallow type confection comprising the steps of:
   creaming a mixture of approximately 24% by weight of shortening and 54% by weight of sugar;
   blending about 10% by weight of water at about 65° F. into said creamed mixture;
   dissolving about 2% by weight of gelatin into about 10% by weight of water; and
   pouring the dissolved gelatin into said creamed mixture and blending.
7. The method of claim 6 including the step of blending about ½% by weight of flavoring into said creamed mixture.
8. The method of claim 7 including the step of adding approximately 5% by weight of nonfat dry milk solids into said creamed mixture.
9. The method of claim 8 wherein said blending step includes blending the creamed mixture and water for 4-6 minutes.
10. The method of claim 9 wherein the step of dissolving the gelatin includes vigorous stirring of the gelatin in heated water at 135°-140° F.

References Cited

UNITED STATES PATENTS

| | | | |
|---|---|---|---|
| 2,619,422 | 11/1952 | Diamond | 99—139 |
| 3,199,988 | 8/1965 | Kozlik et al. | 99—139 |
| 3,556,812 | 1/1971 | Krohn et al. | 99—134 R |

RAYMOND N. JONES, Primary Examiner

J. M. HUNTER, Assistant Examiner